(12) United States Patent
Tabanou et al.

(10) Patent No.: US 8,473,212 B2
(45) Date of Patent: Jun. 25, 2013

(54) LOG PROCESSING IN HIGHLY DEVIATED WELLBORES

(75) Inventors: Jacques R. Tabanou, Houston, TX (US); Bernadette Tabanou, legal representative, Houston, TX (US); John C. Rasmus, Richmond, TX (US); John P. Horkowitz, Sugar Land, TX (US); Koji Ito, Sugar Land, TX (US); Christian Stolte, Winsen (DE); Shahzad Asif, Richmond, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 527 days.

(21) Appl. No.: 12/712,704

(22) Filed: Feb. 25, 2010

(65) Prior Publication Data

US 2010/0312478 A1    Dec. 9, 2010

Related U.S. Application Data

(60) Provisional application No. 61/184,264, filed on Jun. 4, 2009.

(51) Int. Cl.
    *G01V 1/40*     (2006.01)

(52) U.S. Cl.
    USPC .......... 702/7; 702/6; 702/11; 702/16

(58) Field of Classification Search
    USPC .......... 702/6, 7, 8, 10, 11, 12, 13, 16
    See application file for complete search history.

(56) References Cited

U.S. PATENT DOCUMENTS

| | | | |
|---|---|---|---|
| 5,638,337 A | 6/1997 | Priest | |
| 6,078,867 A | 6/2000 | Plumb et al. | |
| 6,594,584 B1 * | 7/2003 | Omeragic et al. | 702/9 |
| 6,856,910 B2 * | 2/2005 | Goswami et al. | 702/10 |
| 6,862,530 B2 | 3/2005 | Fleury et al. | |
| 6,963,803 B2 | 11/2005 | Heliot et al. | |
| 7,027,925 B2 | 4/2006 | Terentyev et al. | |
| 7,107,153 B2 | 9/2006 | Kisra et al. | |
| 7,190,365 B2 | 3/2007 | Fleury | |
| 7,340,347 B2 | 3/2008 | Shray et al. | |
| 2003/0043170 A1 | 3/2003 | Fleury | |
| 2003/0234782 A1 | 12/2003 | Terentyev et al. | |
| 2004/0204855 A1 | 10/2004 | Fleury et al. | |
| 2006/0241867 A1 * | 10/2006 | Kuchuk et al. | 702/13 |
| 2008/0208477 A1 * | 8/2008 | Kelfoun | 702/11 |
| 2009/0254281 A1 | 10/2009 | Hruska et al. | |

* cited by examiner

*Primary Examiner* — Michael Nghiem
*Assistant Examiner* — Paul D Lee
(74) *Attorney, Agent, or Firm* — Jeremy Berman; Darla P. Fonseca (57) ABSTRACT

A method for processing well logging data includes method dividing the well logging data into a number of constant dimensional effect segments, where each constant dimensional effect segment defines an interval having a similar dimensional effect on the log response. The well logging data is taken from a highly deviated well. The method further includes dividing the constant dimensional effect segments into a number of constant property intervals, each constant dimensional effect segment including at least one corresponding constant property interval, and each constant property interval defining a wellbore distance over which a formation property is substantially constant that results in a log response having a low variance. The method further includes providing the constant property intervals to an output device. The method further includes determining constant property intervals in 3D volume space projected them into true stratigraphic thickness, and providing the resulting log-squared data to the output device.

36 Claims, 6 Drawing Sheets

LOG PROCESSING IN HIGHLY DEVIATED WELLBORES

CROSS-REFERENCES

The present application claims priority of U.S. Provisional Patent Application Ser. No. 61/184,264 filed on Jun. 4, 2009. The Provisional Application is incorporated by reference in its entirety.

BACKGROUND

The technical field generally relates to log processing in wellbores for production or injection wells. The technical field relates more particularly but not exclusively to log processing in highly deviated wellbores. Well logging tools provide raw data that is processed to conveniently display desired properties of an earth formation. Processing includes accounting for and removing the determined environmental and dimensional effects on the log and determining the underlying true formation properties. For example, a resistivity tool vertically passing through formation layer boundaries exhibits shoulder bed effects that can be removed by existing processing techniques such as producing an Rt profile from the squared log then forward modeling of the tool response until the modeled log matches the measured log. Presently available log processing methods operate in true vertical depth (TVD) or wellbore measured depth (MD), and do not apply to highly deviated wells, including high angle-horizontal (HAHZ) wells that can exceed 90 degrees of deviation (i.e. portions of the well can be decreasing in TVD. Further, presently available log processing methods have difficulty with wellbore sections that are highly deviated with respect to formation orientation, regardless of the orientation relative to TVD. Therefore, further technological developments are desirable in this area.

SUMMARY

One embodiment is a unique method for log squaring within a 3D measurement volume and also in true stratigraphic thickness while allowing for laterally changing formation properties. Further embodiments, forms, objects, features, tures, advantages, aspects, and benefits shall become apparent from the following description and drawings.

DESCRIPTION OF THE ILLUSTRATIVE EMBODIMENTS

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

Figure 1:
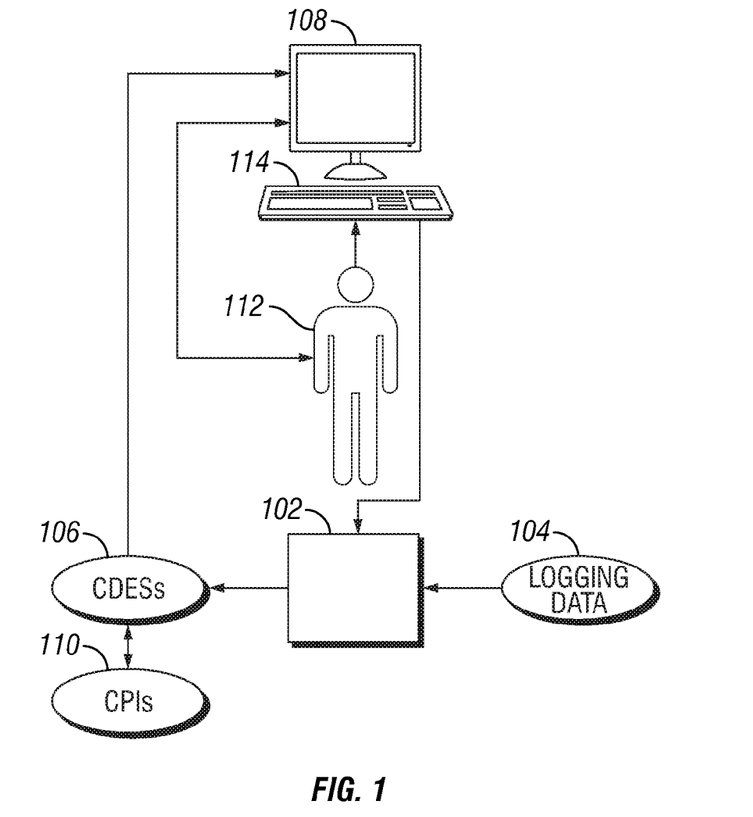
FIG. 1 is a schematic block diagram of a system for log processing in highly deviated wellbores.

FIG. 1 is a schematic block diagram of a system 100 for log processing in highly deviated wellbores. Operations herein are described with reference to highly deviated wellbores, but the techniques apply to any wellbore having logging data and at least one change in a dimensional effect environment for the logging tool. The dimensional effects include any condition that does not represent an infinite, homogeneous medium within or near the formation that affects the reading received by the logging tool. Non-limiting examples of variables that change the dimensional effects include changes in lithology of the formation, the type and volume of fluid present in the formation and the presence and invasion depth of fluid into the formation, natural or induced fractures present in the formation, the formation intersection angle relative to the wellbore, a presence of a nearby formation to the region of interest in the wellbore, anisotropy of any feature of the formation, eccentricity of the tool in the wellbore, a presence of thin (or laminated) formation beds, and combinations of these or other variables.

The system 100 includes a controller 102 in communication with logging data 104 and an output device 108. The controller 102 may be a computer, including a computer program product that includes a computer program stored on a computer readable medium that causes the controller 102 to execute certain operations for log processing. The controller 102 may be a single computer or distributed computers in communication, and the controller 102 may be a computer associated with the output device 108. The output device 108 is any device that accepts information from the controller 102 in a format that is ultimately available for display. Non-limiting examples of output devices 108 include a computer monitor, a printer, a paper output, and/or a computer readable storage medium that is accessible for output (e.g. storage on a web-based server, etc.) The system 100 includes one or more user input devices 114 that communicate with the controller 102 to provide requests or inputs from a user 112 to the controller 102. The controller 102 provides constant dimensional effect segments 106 and/or constant property intervals 110 to the output device 108.

The logging data 104 is available to the controller 102 by any method known in the art. Non-limiting examples include the logging data 104 stored on a computer readable medium (including the controller 102), logging data 104 communicated to the controller 102 from a logging device (e.g. a logging truck, a logging while drilling (LWD) or measurement while drilling (MWD) device, Wired Drill Pipe (WDP), etc.), and/or logging data 104 provided to the controller 102 by a network, datalink, or electronic communication.

Figure 2:
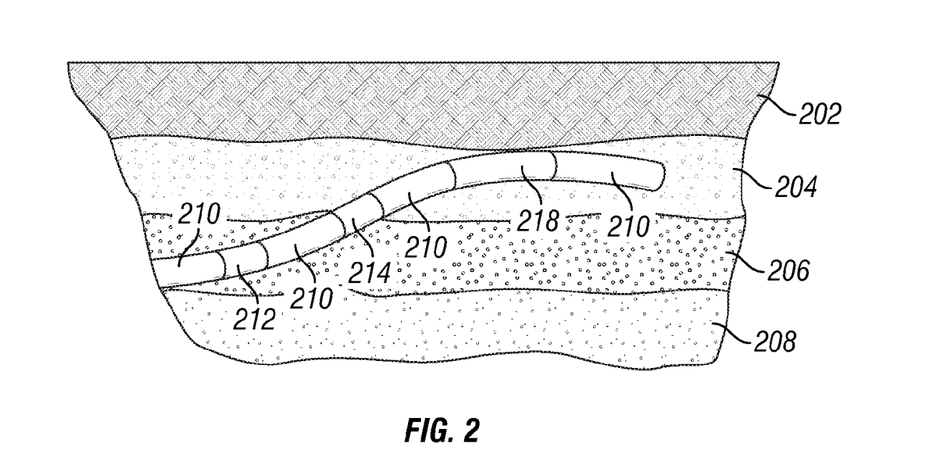
FIG. 2 is a schematic diagram of a highly deviated wellbore segment intersecting several formations.

FIG. 2 is a schematic diagram 200 of a highly deviated wellbore segment 220 intersecting formations. The highly deviated wellbore segment 220 in the example exceeds 90 degrees of deviation—including a portion with decreasing TVD in part of the wellbore segment 220. The wellbore segment 220 is divided into constant dimensional effect segments 106—the segments 210, 212, 214, and 218 in the example. In the diagram 200, the segments 210 of the wellbore 220 are in portions of the wellbore 220 and formations 204, 206 where the logging tool can be treated as if the tool is in an infinite homogenous medium, and formation properties can be determined using standard log processing. All other segments 210 are not in the same formations (e.g. 202, 204, 206, 208), and therefore they are treated as distinct constant dimensional effect segments 106.

In the example of FIG. 2, the segment 212 includes laminated layers (e.g. multiple thin beds below the resolution of the sensor) and a separate processing model is applied to the segment 212, rather than an infinite homogenous medium model. The presence of laminated layers or other effects within a given formation 202, 204, 206, 208 may be determined through forward modeling and inversion of the logging data 104 through the segment 212. The segment 214 is a formation boundary crossing region from the formation 206 to the formation 204, which induces an additional dimensional effect on the logging tool reading through the segment 214. Referencing FIG. 4, the constant dimensional effect segments 410, 414, 418, 422, 428, 432, and 436 are boundary segments. In certain embodiments, the cylinders for the segments 210, 212, 214, 218 represent 3D volumes investigated by the logging data tool (or tools) that generated the logging data 104. Alternatively or additionally, the segments 210, 212, 214, 218 define measured depth regions within the wellbore that have constant dimensional effects.

Certain logging measurements will have a symmetric response (i.e. effects before the boundary crossing are similar to effects after the boundary crossing) at a boundary crossing such as shown at segment 214. A symmetrical response allows a boundary location to be determined from the raw logging data, for example based on an inflection point analysis. The properties of the formations 204, 206 within the segment 214 can be estimated based upon the properties observed in the bulk formations 204, 206 combined with the log responses within the segment 214. Non-limiting examples of symmetrically responsive logging tools include certain types of resistivity measurements (e.g. laterolog tools like geoVISION resistivity), natural gamma ray, and gamma-gamma density.

Certain logging measurements will have asymmetric response at a boundary crossing such as shown at segment 214. An asymmetrical response requires that the logging tool crossing of the boundary be modeled and the boundary location is then reverse calculated. For example, conventional induction and propagation resistivity logs will reduce the apparent thickness of a resistive interval adjacent to a conductive interval due to the conductive shoulder reducing the resistivity as the tool approaches the boundary. When the boundary is crossed and the resistivities of the conductive and non-conductive intervals are known, the position of the boundary can be back calculated. Additionally or alternatively, other measurements can be used to determine the boundary location and properties.

The segment 218 is a region in close proximity to a formation layer 202 (a shoulder or adjacent bed, in the example) which may have differing properties from the formation 204 and therefore provide a different dimensional effect on the logging tool from dimensional effects of the segments 210.

The segments 210, 212, 214, 218 are determined according to conditions expected to affect the logging tool response and therefore introduce the potential that a different processing algorithm will be required to determine the formation properties for each segment 210, 212, 214, 218. The segments 210, 212, 214, 218 are determined by one or more of the following methods: from a log inversion occurrence (e.g. P-wave & S-wave, inversion from real-time geo-steering such as measurements from PeriScope), from an imaging log, from data correlated according to MWD, LWD, mud samples and drilling data, from correlations to seismic data, and/or by any method understood in the art. Segments 210, 212, 214, 218 can be determined from several sources to increase the confidence that a boundary is properly selected, and the sources of boundary selection can be prioritized in order of reliability or confidence to avoid multiple boundary solutions.

The boundary type between segments 210, 212, 214, 218 is also determined. The boundary type can be determined by one or more of the following methods: resistivity combined with nuclear measurements to distinguish structural layer boundaries from fluid contact boundaries, seismic inversions, real-time geo-steering correlations, image derived dips, and PeriScope inversions to distinguish between structural, stratigraphic layer boundaries and faults. Again, several sources can be combined and can be prioritized in order of reliability or confidence to avoid multiple boundary type solutions.

At the boundaries, the boundary properties are determined to better define the boundary and adjacent formation properties more completely. For example, the dip, azimuth, proximity (e.g. where the boundary affects the tool but does not necessarily intersect the wellbore), acoustic impedance, and fluid transmissibility at the boundary can be determined. Dip, azimuth, and proximity can be determined from LWD or Wireline azimuthal images such as those from a very high resolution oriented resistance measurement (e.g. FMI), gamma-ray, geoVISION resistivity, or gamma-gamma density and photo-electric factor (PEF.) Boundary dip can be determined from real-time geo-steering directional electro-magnetic inversions, real-time geo-steering correlations, from seismic inversions, and/or from reservoir models. Directional electro-magnetic inversions (e.g. PeriScope 15 and PeriScope 100), or extrapolated dip of a boundary in 3-D space compared to the wellbore trajectory location can also determine the proximity of the boundary.

Dip measurement uncertainty from multiple dip sources is managed. For example, the dip and dip uncertainty from a wellbore image can be extrapolated to positions away from the wellbore, and can constrain or determine the location of a layer from a PeriScope inversion of the distance to the boundary as the well is drilled. If the extrapolated dip is not an input constraint, a comparison of the dip magnitudes and relative uncertainties can be made and the boundary location manually positioned in 3-D space accordingly.

When the constant dimensional effect segments 106 are determined, the segments 210, 212, 214, 218 can be divided into constant property intervals 110, with at least one constant property interval 110 corresponding to each of the constant dimensional effect segments 106. Each constant property interval 110 is a volume along the wellbore measured depth that has not only the same logging tool response environment (i.e. dimensional effect environment) but also the same basic formation measurement value and/or property value. The basic formation property measurement value need only be substantially the same, which means that measurements with ordinary logging noise, or even with significant variance, may be lumped into the same constant property interval 110 within a constant dimensional effect segment 106 under similar principles that are applied to conventional log squaring analysis. The division of a constant dimensional effect segment 106 into constant property intervals 110 may be performed by using measurement geometrical factors (e.g. enforcing constant property intervals 110 to correspond to a vertical, horizontal, or mixed vertical-horizontal measurement resolution of a logging tool), based on the value change of the measured parameter, based on hierarchical zoning techniques, and/or based on inflection point analysis. Also, statistical techniques, including but not limited to principal component analysis and Bayesian theory may be utilized to add constant property intervals 110 and increase the confidence of reported measured values in certain constant dimensional effect segments 106.

However, in certain embodiments, additional constant property intervals 110 may be added where high resolution of the logging data is desirable and available, and/or where computing power and/or computing time is not a constraint. Where each formation layer 202, 204, 206, 208 is homogenous for the measured parameters, each constant dimensional effect segment 106 will include a single constant property interval 110.

Figure 8:
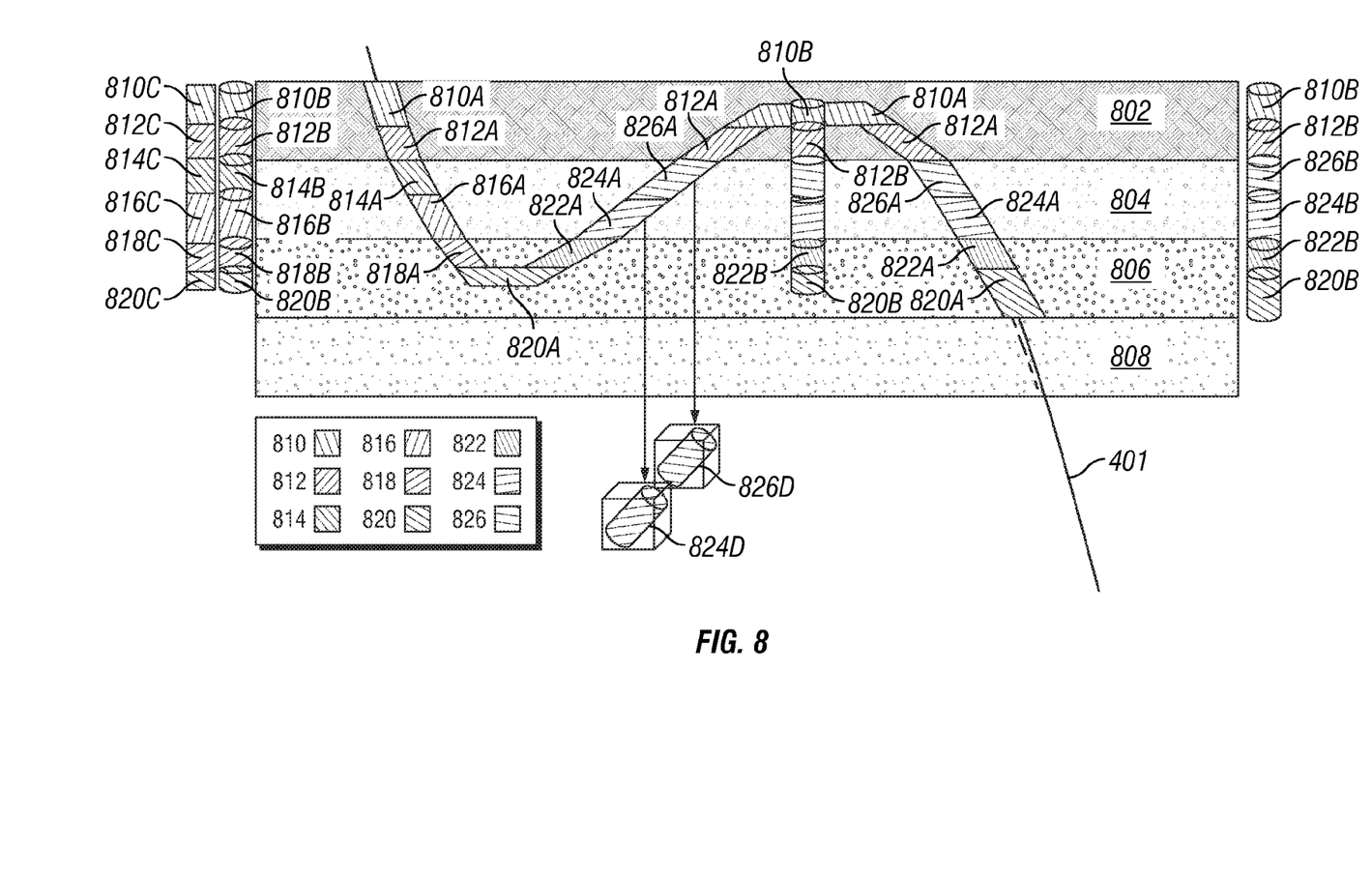
FIG. 8 is a schematic diagram of the 3D measurement volume representation in a HAHZ well and a number of projections of log squared data into true stratigraphic thickness.

Referencing FIG. 8, in certain embodiments log squared data are projected into true stratigraphic thickness. FIG. 8 illustrates several exemplary projections that may be provided to the output device. The illustrated projections in FIG. 8 are exemplary and non-limiting.

An exemplary projection includes a 3-D constant property internal volume in a 3-D layered earth model, for example the 3-D constant property intervals 824*d*, 826*d* which are set aside for clear visualization. The 3-D constant property intervals 824*d*, 826*d* may be 2-dimensional data projected with average information into 3-dimensional space, or they may represent true three-dimensional data (e.g. from an azimuthal measurement) where the 3-dimensional nature and values of the data are apparent from the 3-D constant property intervals 824*d*, 826*d*.

The 3-D constant property internal volumes 824*d*, 826*d* may be positioned in a reservoir grid cell of a 3-D layered earth model. In certain embodiments, the determined 3-D constant property internal volumes are used to populate reservoir model grids using standard up-scaling techniques. This methodology allows the reservoir properties to vary laterally and vertically. Standard reservoir property modeling techniques are then used to propagate the layer properties away from the wellbore both laterally and vertically. This 3D reservoir volume in the near proximity of the wellbore is then used to perform a forward modeling task to re-produce the log measurements. When the actual and modeled logs match, the value assigned to the constant property interval is considered to be the actual formation property value. This procedure can be manual or automated with inversion techniques.

In certain embodiments, the formation volumes are projected into 2D representations of the 3D volumes. An exemplary projection includes a 2-D constant property interval projection in a 2-D layered earth model. The segment 810*a* is a projection of a 3-D constant property interval into a 2-D layered earth model as a portion of the earth formation 802. The logging data may be illustrated with a graphical character (e.g. as shown in the various levels of the projection 506 in FIG. 5), according to a color coding, shading, hatch mark pattern, or any other representation known in the art. In the illustration of FIG. 8, the "a" references indicate 2-D constant property intervals 810*a*, 812*a*, 814*a*, 816*a*, 818*a*, 820*a*, 822*a*, 824*a*, 826*a* projected into a 2-D layered earth model and representing a specific true stratigraphic thickness. Where two or more intervals represent the same stratigraphic region and utilize the same constant property interval (e.g. 812*a* is used in three places), the dimensional effects, modeling, and formation properties are utilized to determine that the intervals are equivalent constant property intervals. Where two or more intervals represent the same stratigraphic region and utilize distinct constant property intervals (e.g. the interval 818*a* and 822*a*) then the dimensional effects, modeling, and formation properties are utilized to determine that the intervals are not equivalent constant property intervals—for example due to differential environments relative to natural fracturing, fluid invasion, diagenetic changes, or other variables.

Yet another exemplary projection includes a 2-D true stratigraphic thickness projections corresponding to a portion of a wellbore trajectory. For example, the 2-D true stratigraphic thickness projections 810*c*, 812*c*, 814*c*, 816*c*, 818*c*, 820*c* correspond to a portion of the wellbore 401. In the example of FIG. 8, the 2-D true stratigraphic thickness projections 810*c*, 812*c*, 814*c*, 816*c*, 818*c*, 820*c* correspond to the first wellbore measured depth occurrence of the constant property interval 820*a* and to the upstream portions of the displayed area. The projections 810*c*, 812*c*, 814*c*, 816*c*, 818*c*, 820*c* may be generated and displayed for any portion of the wellbore 401 including user-selectable portions, and the display may further include identifiers to illustrate which projections correspond to which wellbore portions.

Yet another exemplary projection includes a 3-D true stratigraphic thickness projection corresponding to a portion of a wellbore trajectory. For example, the 3-D true stratigraphic thickness projections 810*b*, 812*b*, 814*b*, 816*b*, 818*b*, 820*b* correspond to the first wellbore measured depth occurrence of the constant property interval 820*a* and to the upstream portions of the displayed area. The 3-D true stratigraphic thickness projections 810*b*, 812*b*, 814*b*, 816*b*, 818*b*, 820*b* may be 2-dimensional data projected with average information into 3-dimensional space, or they may represent true three-dimensional data (e.g. from an oriented log) where the 3-dimensional nature and values of the data are apparent from the projections 810*b*, 812*b*, 814*b*, 816*b*, 818*b*, 820*b*. The projections may be displayed anywhere relative to the wellbore 401, for example the projections 801*b*, 812*b*, 824*b*, 822*b*, 820*b* may be displayed at the curve (in the center of FIG. 8) or off to the side (at the right edge of FIG. 8), or in any other location including a user-selectable location. Any projections (3-D or 2-D) in true stratigraphic thickness may be aligned with the corresponding depths in true stratigraphic thickness, or may have correspondence lines or other markings (not shown), for example if the projections are moved by a user selection. In certain embodiments, an operation includes accepting a user projection selection and updating a displayed projection in response to the user projection selection. The user projection selection may include a projection type, a projection display location, a wellbore section over which to display projected constant property interval, or any other projection selection understood in the art.

Figure 5:
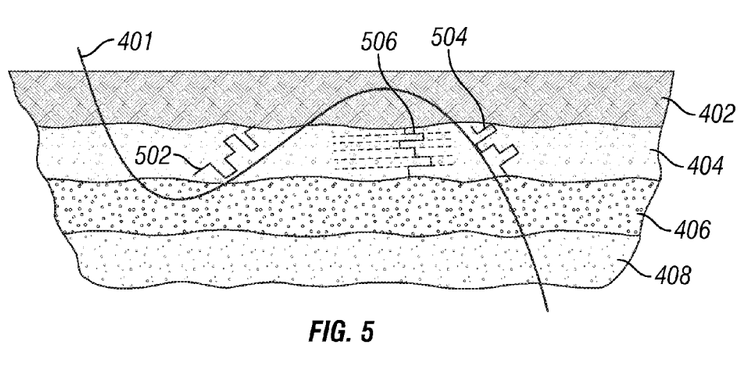
FIG. 5 is an illustration of log-squared data projected into true stratigraphic thickness.

Referencing FIG. 5, the constant property intervals 110 may be projected into TST space—for example a projection 506 of a plurality of constant property intervals 110 into TST space, shown as illustrative log-squared data. The formations 402, 404, 406, 408 may be at any angle, even though they are illustrated as horizontal in the example of FIG. 5. The projection 506 of the constant property intervals 110 in TST space allows the rapid calculation of formation properties at any position in the wellbore 401 and further allows for rapid upscaling of the logging data for incorporation into a reservoir model or comparison to seismic, production, or other non-logging data (or to logging data in an offset wellbore).

Where the wellbore 401 intersects a formation 402, 404, 406, 408, the associated projection 506 of the constant property intervals 110 in TST space provides the formation properties for the wellbore at the appropriate TST position of the wellbore 401. Where the wellbore 401 traverses a large distance horizontally within a formation, the horizontal portion of the wellbore 401 may be divided into multiple constant property intervals 110, resulting in multiple projections 506 of the constant property intervals 110 laterally in TST space for a given formation. The features 502, 504 illustrate log-squared data in wellbore measured depth space, for illustration of what a prior log-squared data output may include.

Several methods may be utilized to determine when a segment will be split into multiple constant property intervals 110. A first criteria is where the measurement physics suggest that multiple constant property intervals are indicated 110. In one example, the minimum thickness in TST space that the constant property interval would represent would be a function of the vertical and radial geometrical factors of the measurement device. In a further example in a vertical well, the constant property interval in measured depth space would represent a thickness in TST space that is no thinner than a predefined function of the vertical resolution of the measurement device. In a horizontal well, a constant property interval in measured depth space would represent a thickness in TST space that is no thinner than a predefined function of the radial geometrical factor of the measurement device. For deviations between these the vertical example and the horizontal example, the minimum thickness will be a weighted average of the function of the two geometrical factors. Once constant property intervals are determined according to measurement criteria thresholds, a new constant property interval is further derived if other criteria are met such as a significant change in the measurement. Thus, a formation is determined to be laterally inhomogeneous and lateral variations in formation properties are represented by the processing. Additional criteria can be applied to the determination of constant property intervals such as geostatistical, seismic, and geological information from other sources.

Where a horizontal segment is split into multiple constant property intervals 110, or where a formation includes a feature such as laminated layers causing multiple dimensional effect segments 106 within a formation (e.g. the CDE 212 in formation 206 of FIG. 2), multiple projections 506 of the constant property intervals 110 in TST space exist for the formation. Where multiple projections 506 of the constant property intervals 110 in TST space exist for a formation 402, 404, 406, 408, a closest projection 506 or a most descriptive projection 506 may be utilized for a given wellbore 401 segment if desired.

Figure 4:
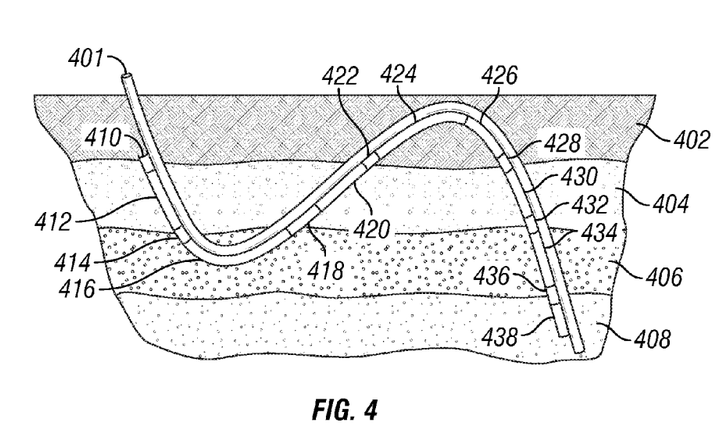
FIG. 4 is an illustration of a number of constant dimensional effect segments.

Referencing FIG. 4, a segment of the wellbore 401 is divided into multiple constant dimensional effect segments 106 (even-numbered elements 410 to 438, inclusive). It is seen that segments 412, 420, and 430 traverse approximately the same TST space of the formation 404. The segments 412, 420, 430, after modeling, may yield similar or distinct projections 506, and therefore they may be associated with a single projection 506 or distinct projections 506 according to the matching and modeling process. Additionally, the lengthy segment 420 may be divided into multiple constant property intervals 106, even if the logging data does not indicate formation property variance, according to geostatistical determinations.

The value of the formation property at the constant property interval 110 is derived by processing the logging tool measurement (e.g. the resistivity) according to the appropriate effects for the response environment. For example, where the eccentering of the logging tool has occurred, an eccentering model is applied to the processing of the logging tool measurement. Modeled effects may be described, in one nominal convention, in terms of a "dimensionality" of the effect. For example, a 0-D model may be a uniform formation near the wellbore, or a simple dielectric effect. Fluid invasion or borehole effects may be modeled in a 1-D radial model. Anisotropy may be modeled in a 0-D model with dip. Eccentering may be modeled with a 1-D radial model. Multiple-effect models may be a boundary crossing effect (e.g. a shoulder bed) as a 1-D model with dip, 2-D model, 2-D with dip, and/or a 3-D model. Natural or induced fractures may be modeled with a 3-D model, and a proximate bed that does not intersect the wellbore may be modeled with a 1-D model. The modeling, the determination of the formation properties at the constant property intervals 110, and even the selection of the constant dimensional effect segments 106 may be an iterative process.

For example, a constant dimensional effect segment 106 may be selected, a boundary type determined and model selected, and the forward model value (i.e. expected tool outcome based on the model and estimated formation properties) compared to the actual tool response to determine whether the proper model was selected. Where there is a match, the model and formation properties are deemed to be proper. Where there is no match, it is estimated whether the model or the formation properties were improper. Where the formation properties can be clearly changed within expected values to produce a match, the formation properties may be determined to be improper, and may be updated to the match values. Where the formation properties cannot be clearly changed within expected values, or where the character of the match may seem improper (e.g. estimating too high in one location and too low in another, etc.), another sensible model may be tried.

This process of forward modeling and inversion may be repeated until normally understood convergence criteria are determined. Example convergence criteria, without limitation, include a best fit to the available data, a fit that improves over a previous fit by less than a convergence value, and/or a fit that converges within acceptable limits. The described iterative matching process is exemplary only, and any log processing model matching process known in the art is contemplated herein. The commercial tool ArcWizard includes models for several effects, and the use of ArcWizard to process LWD measurements is contemplated herein.

In certain embodiments, several models may show a comparable match, and a user 112 may be provided with one or more best matches for selection or approval. For example, a constant dimensional effect segment 106 may fit within a convergence criteria with either a naturally fractured model or with a proximate boundary model. In the example, a user 112 is presented with both models, and may be presented with the option to select a model or confirm a default choice. In certain embodiments, a user 112 may be provided with an interface to observe the constant dimensional effect segments 106 and/or the constant property intervals 110, and may further be provided with an option to change the constant dimensional effect segments 106 and/or the constant property intervals 110. For example, the user 112 may have an interface to combine, divide, or drag the end points of segments 106 or constant property intervals. The user 112 may be presented with fit criteria, data outputs, and/or sensitivity analysis to more easily observe the effects of changes in the segments 106, intervals 110, and/or utilized models.

In certain embodiments, the operations to determine the constant dimensional effect segments 106, constant property intervals 110, and the log processing models are performed in real-time during a drilling operation. For example, PeriScope or other real-time measurement instruments may provide the logging data 104 to the controller 102. In an exemplary embodiment, a drilling parameter is altered in response to the constant dimensional effect segments 106, constant property intervals 110, processed measurement outputs (such as processed logging data, or information derived from the processed logging data) indicating formation property values, and/or the projections 506 of the constant property intervals 110 in TST space. For example, a drilling direction, mud weight, and/or horizontal segment length may be changed. Non-limiting examples include estimating a fluid invasion depth and/or amount and changing a mud weight, estimating a formation permeability and/or hydrocarbon pore volume and lengthening or shortening a horizontal segment length in response.

In certain embodiments, a constant dimensional effect segment 106 is provided with additional constant property intervals 110 at a boundary where the logging tool response is asymmetric. The additional constant property intervals 110 at an asymmetric boundary may be determined using a hierarchical zoning technique with TST and depth of investigation considerations to determine processed measurement outputs at the boundary. In certain embodiments, between 2 and 6 constant property intervals 110 are selected per estimated hydrocarbon pore volume (ft) across the constant dimensional effect segment 106 including the boundary, although any number of constant property intervals 110 supported by the specific logging data are contemplated.

In certain embodiments, a user 112 is provided with an upscaling interface, where the controller 102 receives a user upscaling request. The controller 102 displays upscaled reservoir data in response to the projections 506 of the constant property intervals 110 in TST space and the upscaling request. For example, the controller 102 may display the logging data with the well trajectory in a three-dimensional model of the reservoir, including the area of around the wellbore that is "illuminated" (or investigated) by the logging data 104. The controller 102 may compare the data from the projections 506 to seismic data or other non-logging derived data, to reservoir property models, reserve models, production data, and/or any other type of data known in the art.

In certain embodiments, the constant property intervals 110 include useful information even without the processed measurement outputs. For example, and without limitation, the regions within the wellbore or formations that have substantially uniform formation properties can be used in reservoir planning, drilling, for comparison to other wells, or for general estimates of reservoir heterogeneity even before the processed measurement outputs is complete. The controller 102 can provide the constant property intervals 110 to the output device 108 without the processed measurement outputs, and/or before the processed measurement outputs is completed.

Figure 3:
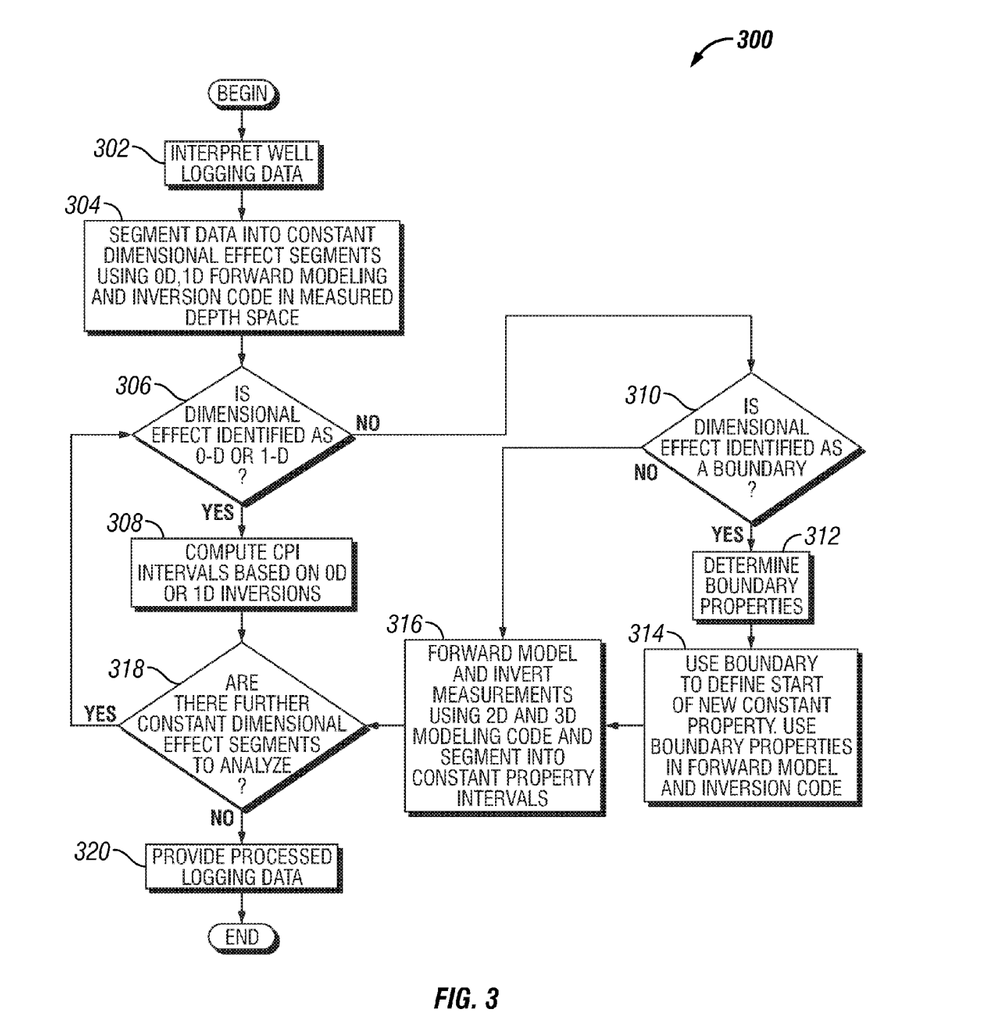
FIG. 3 is a schematic flow diagram of a technique for log processing in highly deviated wellbores.
Figure 6:
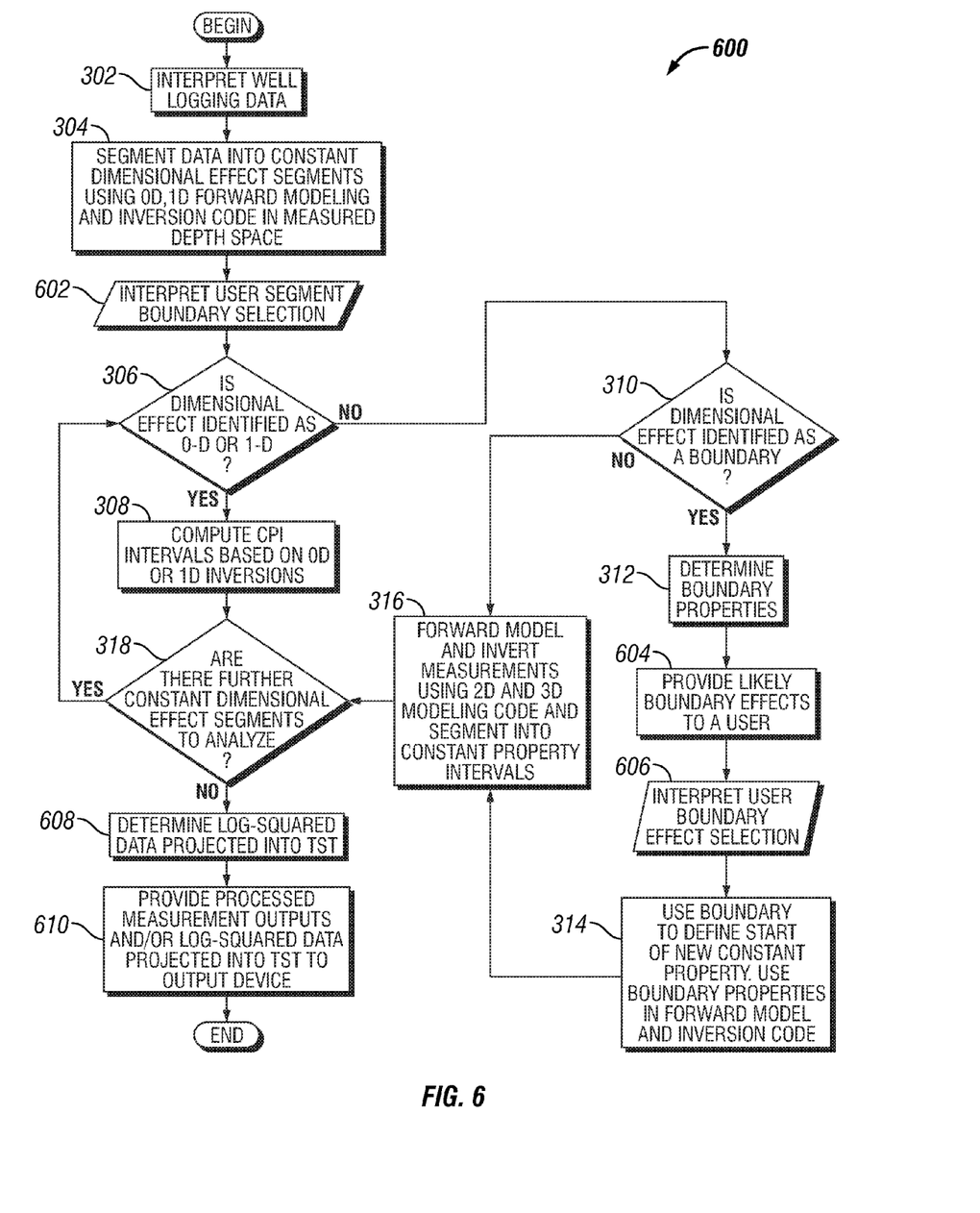
FIG. 6 is a schematic flow diagram of an alternate technique for log processing in highly deviated wellbores.
Figure 7:
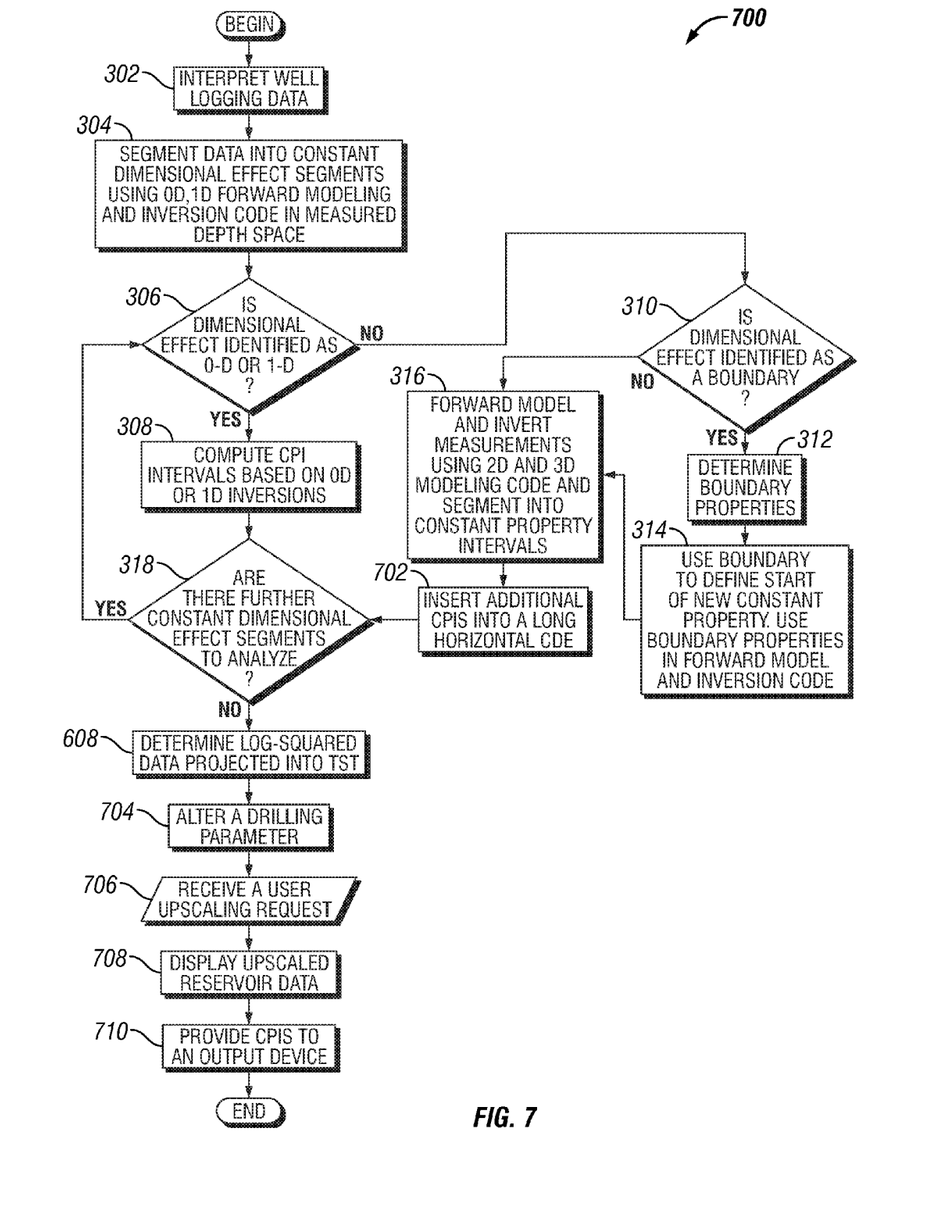
FIG. 7 is a schematic flow diagram of an alternate technique for log processing in highly deviated wellbores.

The schematic flow diagrams in FIGS. 3, 6, and 7, and related descriptions which follow, provide illustrative embodiments of performing techniques or procedures for log processing in highly deviated wellbores. Operations illustrated are understood to be exemplary only, and operations may be combined or divided, and added or removed, as well as re-ordered in whole or part, unless stated explicitly to the contrary herein. Operations illustrated may be implemented by a computer executing a computer program product on a computer readable medium, where the computer program product comprises instructions causing the computer to execute one or more of the operations.

FIG. 3 is a schematic flow diagram of a technique 300 for log processing in highly deviated wellbores. The technique 300 includes an operation 302 to interpret well logging data. Interpreting as used herein includes reading the logging data, receiving the logging data through a datalink or network communication, retrieving from a memory location on a computer readable medium, and/or receiving the logging data by any other method understood in the art. The technique 300 further includes an operation 304 to segment the well logging data into a number of constant dimensional effect segments using 0-D and 1-D forward modeling and inversion in wellbore measured depth space. The technique 300 further includes an operation 306 to determine if a dimensional effect segment is identified as a 0-D or 1-D dimensional effect. Where the operation 306 determines a "YES", the technique 300 includes an operation 308 to divide the dimensional effect segment into constant property intervals according to measurement values, measurement geometrical factors, hierarchical zoning, inflection point analysis, principal component analysis, Bayesian theory, and/or other techniques understood in the art. Where the operation 306 determines a "NO", the technique 300 includes an operation 310 to determine whether the constant dimensional effect segment is identified as a boundary segment.

Where the operation 310 determines a "YES", the technique 300 includes an operation 312 to determine the properties of the boundary and the consequent boundary effects, and an operation 314 to use the boundary to define a start point for a constant property interval. The technique 300 further includes an operation 316 to forward model and invert the measurements using a 2-D or 3-D model identified for the constant dimensional effect segment, including utilizing the boundary effects determined at the operation 312 where the constant dimensional effect segment was determined to be a boundary at operation 310.

The technique 300 includes an operation 318 to determine whether further constant dimensional effect segments remain to be analyzed. The technique 300 iterates to a next constant dimensional effect segment and returns to the operation 306 where the operation 318 determines a "YES". The technique 300 includes an operation 320 to provide processed measurement outputs, such as processed logging data or information derived from the logging data, to an output device where the operation 318 determines a "NO".

FIG. 6 is a schematic flow diagram of an alternate technique 600 for log processing in highly deviated wellbores. In addition to certain operations of the technique 300, the technique 600 includes an operation 602 to interpret a user segment boundary selection or a boundary determination from external data processing—for example a user change of an end point or a segment length of a constant dimensional effect segment, to add a constant dimensional effect segment, and/or to reduce a number of constant dimensional effect segments. The operations of the technique 600 include processing the logging data in response to the user segment boundary selection. The technique 600 further includes an operation 604 to provide a number of most likely boundary effects to a user, and an operation 606 to interpret a user boundary effect selection from the most likely boundary effects—for example a user may select "naturally fractured", "structural boundary", "stratigraphic boundary", "fluid contact", etc., from a set of boundary effects that may be determined to be the most likely effects applicable to a boundary dimensional effect segment. The operations of the technique 600 include processing the logging data further in response to the user boundary effect selection. The technique 600 further includes an operation 608 to determine log-squared data projected into true stratigraphic thickness, and an operation 610 to provide the processed measurement outputs and/or log-squared data to an output device.

FIG. 7 is a schematic flow diagram of an alternate technique 700 for log processing in highly deviated wellbores. In addition to certain operations of the technique 300, the technique 700 includes an operation 702 to divide a long horizontal segment into additional constant property intervals by inserting additional CPIs into the CDE. The technique 700 further includes an operation 608 to determine log-squared data projected into true stratigraphic thickness, and an operation 704 to alter a drilling parameter in response to the log-squared data projected into the true stratigraphic thickness. The altered drilling parameter includes, without limitation, a drilling direction, a mud weight, and/or a horizontal segment length. Non-limiting examples of drilling parameter alterations include increasing or decreasing a mud weight in response to a fluid invasion determination, and increasing or decreasing a horizontal segment length in response to a permeability, porosity, and/or other earth formation property determination.

The technique 700 further includes an operation 706 to receive a user upscaling request, and an operation 708 to display upscaled and/or property modeling reservoir data in response to the user upscaling request. Non-limiting examples of upscaled reservoir data include incorporation of processed logging data into a reservoir model or processed logging data comparisons to seismic, production, or other non-logging data (or to logging data in an offset wellbore). The technique 700 further includes an operation 710 to provide the constant property intervals to an output device.

As is evident from the figures and text presented above, a variety of embodiments according to the present invention are contemplated.

An exemplary embodiment is a method including interpreting well logging data, dividing the well logging data into a plurality of constant dimensional effect segments, where each constant dimensional effect segment defines an interval having a similar effect on a logging tool response. The method further includes determining processed measurement outputs in response to the well logging data and the constant dimensional effect segments, and providing the processed measurement outputs to an output device.

In certain embodiments, the method further includes determining that a constant dimensional effect segment is a boundary segment having a boundary effect including a formation boundary, a formation boundary deviated relative to a wellbore, a region having thin formation beds, a shoulder bed, a fluid invasion change, a presence of fractures, and/or a proximate formation. The exemplary method further includes dividing the constant dimensional effect segments into a plurality of constant property intervals in response to the boundary effect(s), where each constant dimensional effect segment includes at least one corresponding constant property interval, and where each constant property interval defines a wellbore distance over which a formation property is substantially constant. Certain embodiments of the method include using a hierarchical zoning technique to determine a number of constant property intervals in the boundary segment.

The exemplary method further includes determining the processed measurement outputs by performing an iterative forward modeling and inversion of the well logging data, where the forward modeling considers the determined boundary effect, and confirming the determined boundary effect in response to the iterative forward modeling and inversion. The method further includes, in response to the confirming, iteratively changing a type of the determined boundary effect. The exemplary method includes comparing resistivity with nuclear measurements to distinguish a boundary type, and considering the boundary type in the determining the boundary effect. Certain embodiments further include determining a boundary identifier including a dip, an azimuth, a proximity, an acoustic impedance, and/or a fluid transmissibility, and further considering the boundary identifier in the dividing the well logging data into a plurality of constant dimensional effect segments. The exemplary method further includes comparing a plurality of dip data sources, estimating uncertainties in the dip data sources, and determining the boundary identifier comprising the dip in response to the plurality of dip data sources and the estimated uncertainties in the dip data sources. The method further includes, in certain embodiments, taking the logging data from a highly deviated well.

Certain embodiments of the method further include dividing the constant dimensional effect segments into a plurality of constant property intervals, where each constant dimensional effect segment includes at least one corresponding constant property interval, and where each constant property interval defines a wellbore distance over which a formation property is substantially constant. Dividing the constant dimensional effect segments into a plurality of constant property intervals includes utilizing an analysis such as accounting for measurement geometrical factors, accounting for logging value changes, using a hierarchical zoning technique, performing inflection point logic, performing principal component analysis, and/or performing a Bayesian theory analysis. Determining the processed measurement outputs includes performing an iterative forward modeling and inversion of the well logging data, where the forward modeling considers a boundary effect.

The exemplary method includes an operation to determine log-squared data projected into true stratigraphic thickness, and to provide the log-squared data projected into true stratigraphic thickness to the output device. The projection may include a 2-D constant property interval projection in a 2-D layered earth model, a 3-D constant property internal volume in a 3-D layered earth model, a 3-D constant property internal volume in a reservoir grid cell of a 3-D layered earth model, a 2-D true stratigraphic thickness projection corresponding to a portion of a wellbore trajectory, and/or a 3-D true stratigraphic thickness projection corresponding to a portion of a wellbore trajectory.

Another exemplary embodiment is a computer program product that includes a computer useable medium having a computer readable program, where the computer readable program when executed on a computer causes the computer to perform certain operations for log processing in highly deviated wellbores. The operations include interpreting well logging data, dividing the well logging data into a plurality of constant dimensional effect segments, where each constant dimensional effect segment defines an interval having a similar effect on a logging tool response, determining processed measurement outputs in response to the well logging data and the constant dimensional effect segments, and providing the processed measurement outputs to an output device. In certain embodiments, the operations further include determining that a constant dimensional effect segment is a boundary segment having a boundary effect such as a formation boundary, a formation boundary deviated relative to a wellbore, a region having thin formation beds, a shoulder bed, a fluid invasion change, a presence of fractures, and/or a proximate formation.

The exemplary operations further include presenting a plurality of most likely boundary effects to a user, and interpreting a user boundary effect selection from the most likely boundary effects, and/or interpreting a user segment boundary selection. The operations further include determining the processed measurement outputs further in response to the user boundary effect selection and/or the user segment boundary selection. In certain embodiments, the operations further include determining a log-squared data projected into true stratigraphic thickness, and providing the log-squared data projected into true stratigraphic thickness to the output device. In certain embodiments, the log-squared data projected into true stratigraphic thickness to the output device includes a projection such as: a 2-D constant property interval projection in a 2-D layered earth model, a 3-D constant property internal volume in a 2-D layered earth model, a 3-D constant property internal volume in a reservoir grid cell of a 3-D layered earth model, a 2-D true stratigraphic thickness projection corresponding to a portion of a wellbore trajectory, and/or a 3-D true stratigraphic thickness projection corresponding to a portion of a wellbore trajectory. The operations further include accepting a user projection selection and updating a displayed projection in response to the user projection selection.

Yet another exemplary embodiment is a method for processing well logging data including dividing the well logging data into a plurality of constant dimensional effect segments, each constant dimensional effect segment defining an interval having a similar effect on a logging tool response, and further dividing the constant dimensional effect segments into a plurality of constant property intervals, each constant dimensional effect segment including at least one corresponding constant property interval, and each constant property interval defining a wellbore distance over which a formation property is substantially constant. The method further includes providing the constant property intervals to an output device.

Certain embodiments of the method further include determining that a constant dimensional effect segment is a boundary segment having a boundary effect such as a formation boundary, a formation boundary deviated relative to a wellbore, a region having thin formation beds, a shoulder bed, a fluid invasion change, a presence of fractures, and/or a proximate formation. The method further includes determining processed measurement outputs by performing an iterative forward modeling and inversion of the well logging data, where the forward modeling considers the boundary effect.

In certain embodiments, the method includes taking the well logging data from a highly deviated well, and dividing one of the constant dimensional effect segments into additional constant dimensional effect segments in a long horizontal section of the highly deviated well. The highly deviated well may include portions deviated at greater than 90 degrees. The exemplary method further includes dividing the constant dimensional effect segments into a plurality of constant property intervals by determining a constant property interval in measured depth space for a constant dimensional effect segment to represent a thickness in true stratigraphic thickness space that is no thinner than a predefined function of a radial geometrical factor of the logging tool.

In certain embodiments, the logging data is taken from a vertical well, and dividing the constant dimensional effect segments into a plurality of constant property intervals includes determining a constant property interval in measured depth space to represent a thickness in true stratigraphic thickness space that is no thinner than a predefined function of a vertical resolution of the logging tool. In certain embodiments, the logging data is taken from a deviated well, and dividing the constant dimensional effect segments into a plurality of constant property intervals comprises determining a constant property interval in measured depth space to represent a thickness in true stratigraphic thickness space that is a weighted average function of a predefined function of a radial geometrical factor of the logging tool, and a predefined function of a vertical resolution of the logging tool. The exemplary method includes taking data from a wellbore having portions that are vertical, horizontal, and/or deviated between vertical and horizontal, and utilizing varying operations accounting for the radial geometrical factor and the vertical resolution of the logging tool in varying portions of the wellbore.

The method further includes determining that a constant dimensional effect segment is a boundary segment, and using a hierarchical zoning technique with true stratigraphic depth and depth of investigation considerations to determine a number of constant property intervals in the boundary segment. The method further includes determining that a constant dimensional effect segment is a boundary segment, and increasing a number of constant property intervals in the boundary segment.

In certain embodiments, the method includes determining a log-squared data projected into true stratigraphic thickness, and providing the log-squared data projected into true stratigraphic thickness to the output device. The exemplary method further includes receiving a user upscaling request, and displaying upscaled and/or property modeling reservoir data in response to the log-squared data projected into true stratigraphic thickness and the user upscaling request. The method further includes, in certain embodiments, altering a drilling parameter in response to the log-squared data projected into the true stratigraphic thickness. The drilling parameter includes a parameter such as a drilling direction, a mud weight, and/or a horizontal segment length.

While the invention has been illustrated and described in detail in the drawings and foregoing description, the same is to be considered as illustrative and not restrictive in character, it being understood that only certain exemplary embodiments have been shown and described and that all changes and modifications that come within the spirit of the inventions are desired to be protected. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A method, comprising:
   interpreting well logging data;
   using a controller, dividing the well logging data into a plurality of constant dimensional effect segments, each constant dimensional effect segment defining an interval having a similar dimensional effect on a logging tool response;
   using the controller, further dividing the constant dimensional effect segments into a plurality of constant property intervals, each constant dimensional effect segment comprising at least one corresponding constant property interval, and each constant property interval defining a wellbore distance over which at least one of a formation property and a measurement response is substantially constant, wherein further dividing the constant dimensional effect segments into a plurality of constant property intervals comprises determining a constant property interval in measured depth space to represent a thickness in true stratigraphic thickness space that is a weighted average function of a predefined function of a radial geometrical factor of the logging tool and a predefined function of a vertical resolution of the logging tool;
   using the controller, determining processed measurement outputs in response to the well logging data and the constant dimensional effect segments; and
   using the controller, providing the processed measurement outputs to an output device.

2. The method of claim 1, further comprising determining that a constant dimensional effect segment is a boundary segment having at least one boundary effect selected from the boundary effects consisting of: a formation boundary, a formation boundary deviated relative to a wellbore, a region having thin formation beds, a shoulder bed, a fluid invasion change, a presence of fractures, a fluid contact, a dielectric property change, an eccentered tool in the wellbore, and a proximate formation.

3. The method of claim 2, further comprising using a hierarchical zoning technique to determine the number of constant property intervals in the boundary segment.

4. The method of claim 2, wherein the determining the processed measurement outputs comprises performing an iterative forward modeling and inversion of the well logging data, wherein the forward modeling considers the determined boundary effect, and confirming the determined boundary effect in response to the iterative forward modeling and inversion.

5. The method of claim 4, further comprising, in response to the confirming, iteratively changing a type of the determined boundary effect.

6. The method of claim 2, further comprising comparing resistivity with nuclear measurements to distinguish a boundary type, and considering the boundary type in the determining the boundary effect.

7. The method of claim 2, further comprising determining at least one boundary identifier selected from the identifiers consisting of: a dip, an azimuth, a proximity, an acoustic impedance, and a fluid transmissibility, and considering the boundary identifier in the dividing the well logging data into a plurality of constant dimensional effect segments.

8. The method of claim 7, further comprising comparing a plurality of dip data sources, estimating uncertainties in the dip data sources, and determining the boundary identifier comprising the dip in response to the plurality of dip data sources and the estimated uncertainties in the dip data sources.

9. The method of claim 1, wherein the well logging data is taken from a highly deviated well.

10. The method of claim 1, further comprising dividing the constant dimensional effect segments into a plurality of constant property intervals, each constant dimensional effect segment comprising at least one corresponding constant property interval, and each constant property interval defining a wellbore distance over which a formation property is substantially constant.

11. The method of claim 10, wherein dividing the constant dimensional effect segments into a plurality of constant property intervals comprises utilizing at least one analysis selected from the analyses consisting of: accounting for measurement geometrical factors, accounting for logging value changes, using a hierarchical zoning technique, performing inflection point logic, performing principal component analysis, and performing a Bayesian theory analysis.

12. The method of claim 1, wherein the determining the processed measurement outputs comprises performing an iterative forward modeling and inversion of the well logging data, wherein the forward modeling considers a boundary effect.

13. The method of claim 1, further comprising determining a log-squared data projected into true stratigraphic thickness, and providing the log-squared data projected into true stratigraphic thickness to the output device.

14. The method of claim 13, wherein the log-squared data projected into true stratigraphic thickness comprises a projection selected from the projections consisting of: a 2-D constant property interval projection in a 2-D layered earth model; a 3-D constant property internal volume in a 3-D layered earth model; a 3-D constant property internal volume in a reservoir grid cell of a 3-D layered earth model; a 2-D true stratigraphic thickness projection corresponding to a portion of a wellbore trajectory; and a 3-D true stratigraphic thickness projection corresponding to a portion of a wellbore trajectory.

15. A computer program product comprising a non-transitory computer useable medium having a computer readable program, wherein the computer readable program when executed on a computer causes the computer to:
  interpret well logging data;
  divide the well logging data into a plurality of constant dimensional effect segments, each constant dimensional effect segment defining an interval having a similar dimensional effect on a logging tool response;
  further divide the constant dimensional effect segments into a plurality of constant property intervals, each constant dimensional effect segment comprising at least one corresponding constant property interval, and each constant property interval defining a wellbore distance over which at least one of a formation property and a measurement response is substantially constant, wherein further dividing the constant dimensional effect segments into a plurality of constant property intervals comprises determining a constant property interval in measured depth space to represent a thickness in true stratigraphic thickness space that is a weighted average function of a predefined function of a radial geometrical factor of the logging tool and a predefined function of a vertical resolution of the logging tool;
  determine processed measurement outputs in response to the well logging data and the constant dimensional effect segments; and
  provide the processed measurement outputs to an output device.

16. The computer program product of claim 15, wherein the computer readable program when executed on a computer causes the computer to further determine that a constant dimensional effect segment is a boundary segment having at least one boundary effect selected from the boundary effects consisting of: a formation boundary, a formation boundary deviated relative to a wellbore, a region having thin formation beds, a shoulder bed, a fluid invasion change, a presence of fractures, and a proximate formation.

17. The computer program product of claim 16, wherein the computer readable program when executed on a computer further causes the computer to present a plurality of most likely boundary effects to a user.

18. The computer program product of claim 17, wherein the computer readable program when executed on a computer further causes the computer to interpret a user boundary effect selection from the most likely boundary effects, and to determine the processed measurement outputs further in response to the user boundary effect selection.

19. The computer program product of claim 16, wherein the computer readable program when executed on a computer further causes the computer to interpret a user segment boundary selection and to determine the processed measurement outputs further in response to the user segment boundary selection.

20. The computer program product of claim 15, wherein the computer readable program when executed on a computer further causes the computer to determine a logsquared data projected into true stratigraphic thickness, and to further provide the logsquared data projected into true stratigraphic thickness to the output device.

21. The computer program product of claim 20, wherein the log-squared data projected into true stratigraphic thickness to the output device comprises a projection selected from the projections consisting of: a 2-D constant property interval projection in a 2-D layered earth model; a 3-D constant property internal volume in a 3-D layered earth model; a 3-D constant property internal volume in a reservoir grid cell of a 3-D layered earth model; a 2-D true stratigraphic thickness projection corresponding to a portion of a wellbore trajectory; and a 3-D true stratigraphic thickness projection corresponding to a portion of a wellbore trajectory.

22. A method for processing well logging data, comprising:
using a controller, dividing the well logging data into a plurality of constant dimensional effect segments, each constant dimensional effect segment defining an interval having a similar dimensional effect on a logging tool response, the logging data being taken from a deviated well;
using the controller, further dividing the constant dimensional effect segments into a plurality of constant property intervals, each constant dimensional effect segment comprising at least one corresponding constant property interval, and each constant property interval defining a wellbore distance over which at least one of a formation property and a measurement response is substantially constant, wherein further dividing the constant dimensional effect segments into a plurality of constant property intervals comprises determining a constant property interval in measured depth space to represent a thickness in true stratigraphic thickness space that is a weighted average function of a predefined function of a radial geometrical factor of the logging tool and a predefined function of a vertical resolution of the logging tool.

23. The method of claim 22, further comprising determining that a constant dimensional effect segment is a boundary segment having at least one boundary effect selected from the boundary effects consisting of: a formation boundary, a formation boundary deviated relative to a wellbore, a region having thin formation beds, a shoulder bed, a fluid invasion change, a presence of fractures, and a proximate formation.

24. The method of claim 23, further comprising determining processed measurement outputs by performing an iterative forward modeling and inversion of the well logging data, wherein the forward modeling considers the boundary effect.

25. The method of claim 22, wherein the well logging data is taken from a highly deviated well.

26. The method of claim 25, further comprising dividing one of the constant dimensional effect segments into additional constant dimensional effect segments in a long horizontal section of the highly deviated well.

27. The method of claim 25, wherein further dividing the constant dimensional effect segments into a plurality of constant property intervals comprises determining a constant property interval in measured depth space to represent a thickness in true stratigraphic thickness space that is no thinner than a predefined function of a radial geometrical factor of the logging tool.

28. The method of claim 25, wherein the highly deviated well includes portions deviated at greater than 90-degrees.

29. The method of claim 22, wherein the logging data is taken from a vertical well, and wherein further dividing the constant dimensional effect segments into a plurality of constant property intervals comprises determining a constant property interval in measured depth space to represent a thickness in true stratigraphic thickness space that is no thinner than a predefined function of a vertical resolution of the logging tool.

30. The method of claim 22, further comprising determining a constant dimensional effect segment is a boundary segment, and using a hierarchical zoning technique with true stratigraphic depth and depth of investigation considerations to determine a number of constant property intervals in the boundary segment.

31. The method of claim 22, further comprising determining a constant dimensional effect segment is a boundary segment, and increasing a number of constant property intervals in the boundary segment.

32. The method of claim 22, further comprising determining log-squared data projected into true stratigraphic thickness, and providing the log-squared data projected into true stratigraphic thickness to the output device.

33. The method of claim 32 wherein the log-squared data projected into true stratigraphic thickness comprises a projection selected from the projections consisting of: a 2-D constant property interval projection in a 2-D layered earth model; a 3-D constant property internal volume in a 3-D layered earth model; a 3-D constant property internal volume in a reservoir grid cell of a 3-D layered earth model; a 2-D true stratigraphic thickness projection corresponding to a portion of a wellbore trajectory; and a 3-D true stratigraphic thickness projection corresponding to a portion of a wellbore trajectory.

34. The method of claim 32, further comprising receiving a user upscaling request, and displaying at least one of upscaled reservoir data and property modeled reservoir data in response to the log-squared data projected into true stratigraphic thickness and the user upscaling request.

35. The method of claim 32, further comprising altering a drilling parameter in response to the log-squared data projected into the true stratigraphic thickness.

36. The method of claim 35, wherein the drilling parameter comprises a parameter selected from the parameters consisting of a drilling direction, a mud weight, and a horizontal segment length.

* * * * *